2,919,249

ELECTROLUMINESCENT PHOSPHORS

Keith H. Butler, Marblehead, Horace H. Homer, Arlington, and Richard M. Rulon, Wenham, Mass., assignors, by mesne assignments, to Sylvania Electric Products Inc., Wilmington, Del., a corporation of Delaware No Drawing. Application November 25, 1953
Serial No. 394,512

2 Claims. (Cl. 252—301.6)

This invention relates to electroluminescent phosphors, that is to phosphors which become luminescent under the action of an electric field.

Phosphors of this type are now known, for example, properly activated zinc sulfide. Such phosphors have previously been prepared for electroluminescence in an oxidizing or inert atmosphere.

We have discovered, however, that the electroluminescence of such phosphors is greatly increased if they are instead fired in a slightly reducing atmosphere. But if the reducing nature of the atmosphere is increased until it becomes highly reducing, the luminescence will be decreased.

The increased luminescence with a slightly reducing atmosphere may be due to a reduction in the number or depth of traps, because a reducing atmosphere tends to inhibit the formation of traps. The decrease in brightness as the atmosphere is made more highly reducing may be due to too great a reduction in the number or depth of traps, or to a reduction in the concentration of donor or acceptor atoms, which is presumably enhanced by trap-producing conditions, since donors and acceptors, like traps, are due to impurities or imperfections in the crystal. The effect of the reducing atmosphere may, however, be due to entirely different reasons, for example, to some change in the surface layer of the phosphor.

Other features, objects and advantages of the invention will be apparent from the following specification.

In one embodiment of the invention, we mixed the following ingredients as fine dry powders in the mole proportions given:

| Substance: | Moles |
|---|---|
| ZnS (containing 2% $ZnCl_2$) | 0.05 |
| ZnS (free from $ZnCl_2$) | 0.90 |
| ZnO | 0.05 |
| $PbCO_3$ | 0.0005 |
| CuO | 0.0006 |

The lead can be omitted if higher copper contents are used, say 0.002 mole per mole of zinc sulfide.

The mixture was then fired at a temperature of 1720° F. for about thirty minutes, by being passed through a furnace held at that temperature while a gaseous atmosphere flowed counter to the direction of travel of the mixture, for example, as described in copending application Serial No. 230,713, filed June 8, 1951, by Keith H. Butler and Horace H. Homer, now U.S. Patent No. 2,728,730.

The fired powder was lightly crushed and then treated with a hot solution of 5% acetic acid in water, then washed in a similar hot 1% acetic acid solution, and afterward in hot water.

The light output was determined by mixing 1.5 grams of the phosphor with 1.25 cc. of castor oil and placing the mixture between a sheet of conducting glass and a piece of metal fixed to give a spacing of 0.008 inch between the glass and the metal. A voltage of 500 volts, 60 cycles per second alternating current, was applied between the piece of conducting glass and the metal and the light measured with a photoelectric cell and a suitable meter.

The luminescent output was as follows, varying with the atmosphere flowing over the phosphor during firing as shown:

| Atmosphere: | Light output relative units |
|---|---|
| 90% nitrogen, 10% hydrogen | 540 |
| 97% nitrogen, 3% hydrogen | 1035 |
| 100% nitrogen | 790 |
| 79% nitrogen, 21% oxygen | 660 |

The electroluminescence of the above phosphor was largely in the blue. A green electroluminescent phosphor can be prepared in the same manner, starting with the following mixture:

| Substance: | Moles |
|---|---|
| ZnS (including 2% $ZnCl_2$) | 0.95 |
| ZnO | 0.05 |
| $PbCO_3$ | 0.001 |
| CuO | 0.001 |

The luminescent output of the resultant phosphor was as follows, depending on the atmosphere used:

| Atmosphere: | Light output relative units |
|---|---|
| 90% nitrogen, 10% hydrogen | 730 |
| 97% nitrogen, 3% hydrogen | 1285 |
| 100% nitrogen | 1060 |
| 79% nitrogen, 21% oxygen | 1060 |

It is seen from the above that the slightly reducing atmosphere is best in each case. Such an atmosphere is also beneficial to phosphors containing manganese in activating amounts. For example, about 0.01 gram-atoms manganese per mole of zinc sulfide, added to the mixture of the second example above, before firing will give a yellow-electroluminescing phosphor, which is improved by the use of slightly reducing atmosphere similar to the above examples.

What we claim is:

1. The method of making an electroluminescent phosphor which comprises mixing zinc sulfide with a copper activating compound, and firing the resultant mixture in an atmosphere comprising 3% hydrogen and 97% nitrogen.

2. The method of making an electroluminescent phosphor which comprises mixing zinc sulfide containing activating compounds of copper and lead, and firing the resultant mixture in an atmosphere of about 3% hydrogen and about 97% nitrogen.

References Cited in the file of this patent

UNITED STATES PATENTS 2,660,566   Froelich _____ Nov. 24, 1953

OTHER REFERENCES

Froelich II, article in J. Electrochem. Soc., vol. 100, No. 11, November 1953, pp. 496–507.